Patented Feb. 13, 1951

2,541,584

UNITED STATES PATENT OFFICE 2,541,584

N-ACYLATED PIPERAZINES

Arthur L. Jacoby, Western Springs, Ill., assignor to National Aluminate Corporation, Chicago, Ill., a corporation of Delaware No Drawing. Application June 11, 1947,
Serial No. 754,061

10 Claims. (Cl. 260—268)

This invention relates to high molecular weight acylated piperazines, and more specifically to new chemical compounds of that character having the general formula:

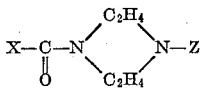

where X is the alkyl radical of an aliphatic carboxylic acid which may contain one or more double bonds and may contain substituent groups, e. g., hydroxyl, that is X—C=O is the acyl radical of such an acid; and Z is the acyl radical of an aliphatic carboxylic acid, an aromatic carboxylic acid, or an arylsulfonic acid.

The present application is a continuation-in-part of my copending application Serial No. 436,494, filed March 27, 1942, now Patent No. 2,428,801.

The compounds of this invention, when conforming to certain structural limitations as more fully set forth hereinafter, are greases or waxes of varying degrees of hardness and are valuable as substitutes for natural waxes, as constituents of coating compositions, as corrosion inhibitors, as defoamers, and as intermediates for the preparation of other valuable compounds.

For the sake of convenience, the compounds of this invention may be divided into three classifications.

First, there is the class consisting of diacyl piperazines, in which both acyl groups are derived from aliphatic carboxylic acids and in which the two acyl groups are substantially equal in the number of carbon atoms in each, and in which each acyl group is derived from an acid containing at least 8 carbon atoms (X in the general formula would contain at least 7 carbon atoms). Examples of such compounds are dioctanoylpiperazine, didodecanoylpiperazine (dilaurylpiperazine), and dioctadecanoylpiperazine (distearylpiperazine).

Second, there is the class consisting of diacyl piperazines, in which both acyl groups are derived from aliphatic carboxylic acids, but where the two groups differ widely from each other with respect to the number of carbon atoms in each. In this class, the larger acyl group should be derived from an acid having at least 12 carbon atoms (X in the general formula would contain at least 11 carbon atoms). An example of a compound falling into this class is N-acetyl-N'-laurylpiperazine.

The third class consists of diacyl piperazines in which one acyl radical is derived from an aliphatic acid of at least 12 carbon atoms (X in the general formula would contain at least 11 carbon atoms), and the other acyl radical is that of an aromatic carboxylic or an arylsulfonic acid. Examples of such compounds include N-lauryl-N'-benzoylpiperazine and N-stearyl-N'-benzenesulfonylpiperazine.

The compounds of this invention may be prepared in numerous ways, and under a variety of conditions. Thus, from the standpoint of starting materials, it is possible to effect the acylation of piperazine by a number of acylating agents including the acids, acid halides, acid amides, and esters. Also, either piperazine itself, or its hydrate, may be employed as a starting material. The conditions under which the preparations are carried out may also vary widely, it being possible to work below, at, or above atmospheric pressure, with or without a solvent, or at various temperatures, as will be understood by one skilled in the art.

It is not intended that the invention be limited in scope to acylated piperazines prepared by any particular route, or in any particular manner, and the following examples are given merely by way of illustration.

Example I

A mixture of 5.8 grams (0.03 mole) of piperazine hexahydrate and 15.4 grams (0.06 mole) of palmitic acid was heated carefully until most of the water had been expelled and frothing ceased. Then it was stirred at 150–160° C. for about 3 hours. When cool, the product was a tan wax. After recrystallization from methanol or acetone, the product melted at 79.5–80° C. and was identified as dipalmitylpiperazine by analysis. Calculated for $C_{36}H_{70}O_2N_2$: N=4.98%. Found: N=5.01% and 5.05%.

Example II

Commercial stearic acid, having a mean molecular weight of about 269, was employed in this preparation. Sixteen grams (0.06 mole) of the acid and 5.8 grams (0.03 mole) of piperazine hexahydrate were mixed and heated carefully to expel the most of the water. Then the product was stirred 2.5 hours at 150–160° C. When cool, the product was a brown wax.

Substantially the same product was prepared, but in a purer form, by the reaction of 2.58 grams (0.03 mole) of piperazine and 17.1 grams (0.06 mole) of purified stearic acid. This product was also a wax, and after several recrystallizations from methanol it melted at 83–83.5° C. and was identified as dioctadecanoylpiperazine (distearylpiperazine) by analysis. Calculated for $C_{40}H_{78}O_2N_2$: N=4.53%. Found: N=4.42% and 4.43%.

The unrecrystallized product was readily soluble in benzene or carbon tetrachloride and slightly soluble in ethanol or petroleum ether.

*Example III*

A mixture of 8.1 grams (0.03 mole) of the commercial stearic acid of Example II and 5.8 grams (0.03 mole) of piperazine hexahydrate was heated carefully to expel water and then stirred 2 hours at 150–160° C. Then 2.36 grams (0.03 mole) of acetyl chloride was added and allowed to react 15 minutes. When cool, the product, which contained a substantial proportion of N-acetyl-N'-octadecanoylpiperazine (N-acetyl-N'-stearylpiperazine), was a brown wax. It was readily soluble in benzene or carbon tetrachloride and slightly soluble in ethanol or petroleum ether.

*Example IV*

8.1 grams (0.03 mole) of the commercial stearic acid of Example II, 5.8 grams (0.03 mole) of piperazine hexahydrate, and 4.2 grams (0.03 mole) of benzoyl chloride were condensed by the same procedure as outlined in Example III. When cool, the product which contained a substantial proportion of N-stearyl-N'-benzoylpiperazine, was a dark brown wax and exhibited about the same solubility characteristic as the product of Example III.

*Example V*

8.1 grams (0.03 mole) of the commercial stearic acid of Example II, 5.8 grams (0.03 mole) of piperazine hexahydrate, and 5.7 grams (0.03 mole) of p-toluenesulfonyl chloride were condensed by the same procedure as outlined in Example III. When cool, the product, which contained a substantial proportion of N-octadecanoyl-N'-toluenesulfonylpiperazine (N-stearyl-N'-toluenesulfonylpiperazine), was a dark brown wax which exhibited slight solubility in benzene, carbon tetrachloride, or ethanol, and insolubility in low-boiling petroleum ether.

*Example VI*

A mixture of 22.6 grams (0.08 mole) of oleic acid and 3.44 grams (0.04 mole) of piperazine was stirred for 3 hours at 150–160° C. When cool, the dioleylpiperazine was a clear, viscous oil, easily soluble in benzene, carbon tetrachloride, ethanol or petroleum ether.

*Example VI*

A mixture of 12.1 grams (0.084 mole) of caprylic (octanoic) acid and 8.1 grams (0.042 mole) of piperazine hexahydrate was heated carefully at about 120° C. until the tendency to froth had disappeared and then stirred 2.5 hours at 150–160° C. When cool, the product was a brown wax which was identified as dioctanoylpiperazine by analysis after recrystallization from methanol to a melting point of 167° C. Calculated for $C_{20}H_{38}O_2N_2$: N=7.73%. Found: N=7.79% and 7.83%.

*Example VIII*

A mixture of 13.7 grams (0.06 mole) of myristic acid and 5.8 grams (0.03 mole) of piperazine hexahydrate was stirred at 150–160° C. for 3 hours. When cool, the product was a wax which was readily soluble in benzene or carbon tetrachloride and slightly soluble in ethanol or petroleum ether. After several recrystallizations from methanol, it melted at 75° C. and was identified as dimyristylpiperazine by analysis. Calculated for $C_{32}H_{62}O_2N_2$: N=5.53%. Found: N=5.55% and 5.53%.

*Example IX*

A mixture of 20 grams (0.1 mole) of lauric acid and 9.7 grams (0.05 mole) of piperazine hexahydrate was heated cautiously at about 110° C. until the tendency to froth was gone and then stirred 2.5 hours at 150–160° C. The product was a brown wax which, after several recrystallizations from methanol, melted at 133–134° C. and was identified as didodecanoylpiperazine (dilaurylpiperazine) by analysis. Calculated for $C_{28}H_{54}O_2N_2$: N=6.24%. Found: N=6.35% and 6.19%.

*Example X*

A mixture of 59.6 grams (0.2 mole) of ricinoleic acid and 19.4 grams (0.1 mole) of piperazine hexahydrate was heated carefully at about 120–130° C. until frothing ceased and then stirred for 3 hours at 150–160° C. When cool, the diricinoleylpiperazine was a viscous oil, easily soluble in benzene, carbon tetrachloride, or ethanol, and insoluble in low-boiling petroleum ether.

*Example XI*

A mixture of 6.9 grams (0.03 mole) of myristic acid and 5.8 grams (0.03 mole) of piperazine hexahydrate was heated carefully at about 110–120° C. until frothing ceased and then stirred 2 hours at 150–160° C. To the stirred mixture was then added 2.36 grams (0.03 mole) of acetyl chloride and the mixture stirred 15 minutes longer. When cool, the N-acetyl-N'-myristylpiperazine was a tan wax which was readily soluble in benzene or carbon tetrachloride and slightly soluble in ethanol or petroleum ether. Several recrystallizations gave a melting point of 74–75° C.

Having thus described my invention, what I claim as new and desire to secure by Letters Patent of the United States is:

1. A diacylated piperazine in which both acyl groups are derived from aliphatic carboxylic acids and in which said acyl groups are substantially equal in number of carbon atoms and each contains at least 7 carbon atoms.

2. A diacylated piperazine in which both acyl groups are derived from aliphatic carboxylic acids and in which said acyl groups differ widely from each other with respect to the number of carbon atoms in each, the larger acyl group containing at least 11 carbon atoms.

3. A diacylated piperazine in which one acyl group is derived from an aliphatic carboxylic acid of at least 12 carbon atoms and the other acyl group is derived from an arylsulfonic acid.

4. N,N'-dioctadecanoylpiperazine.

5. N-acetyl-N'-octadecanoylpiperazine.

6. N-stearyl-N'-toluenesulfonylpiperazine.

7. A diacylated piperazine in which one acyl group is derived from an aliphatic carboxylic acid of at least 12 carbon atoms and the other acyl group is derived from an aromatic carboxylic acid.

8. A diacylated piperazine from the group consisting of (a) diacylated piperazines in which both acyl groups are derived from aliphatic carboxylic acids and in which said acyl groups are substantially equal in number of carbon atoms and each contains at least 7 carbon atoms; (b)

diacylated piperazines in which both acyl groups are derived from aliphatic carboxylic acids and in which said acyl groups differ widely from each other with respect to the number of carbon atoms in each, the larger acyl group containing at least 11 carbon atoms; (c) diacylated piperazines in which one acyl group is derived from an aliphatic carboxylic acid of at least 12 carbon atoms and the other acyl group is derived from an arylsulfonic acid; and (d) diacylated piperazines in which one acyl group is derived from an aliphatic carboxylic acid of at least 12 carbon atoms and the other acyl group is derived from an aromatic carboxylic acid.

9. N-stearyl-N'-benzoylpiperazine.
10. Diricinoleylpiperazine.

ARTHUR L. JACOBY.

REFERENCES CITED

The following references are of record in the file of this patent:

UNITED STATES PATENTS

| Number | Name | Date |
|---|---|---|
| 2,262,357 | De Groote | Nov. 11, 1941 |

FOREIGN PATENTS

| Number | Country | Date |
|---|---|---|
| 4,058 | Sweden | Apr. 13, 1892 |
| 122,294 | Switzerland | Sept. 1, 1927 |
| 578,342 | Great Britain | June 25, 1946 |

OTHER REFERENCES

Jacobi, Berichte 66, 113–115 (1933).